(12) United States Patent
Chang

(10) Patent No.: US 10,466,046 B1
(45) Date of Patent: Nov. 5, 2019

(54) EXTERNAL DISPLAY RANGEFINDER

(71) Applicant: TUNG SHRIM ENTERPRISE CO., LTD., Taichung (TW)

(72) Inventor: Wen-I Chang, Taichung (TW)

(73) Assignee: TUNG SHRIM ENTERPRISE CO., LTD., Taichung (TW)

(*) Notice: Subject to any disclaimer, the term of this patent is extended or adjusted under 35 U.S.C. 154(b) by 0 days.

(21) Appl. No.: 16/132,480

(22) Filed: Sep. 17, 2018

(30) Foreign Application Priority Data

Jun. 25, 2018 (TW) .............................. 107208513 U

(51) Int. Cl.
*G01N 21/00* (2006.01)
*G01C 3/04* (2006.01)
*G02B 23/18* (2006.01)
*G02B 23/24* (2006.01)
*G02B 7/04* (2006.01)

(52) U.S. Cl.
CPC ................. *G01C 3/04* (2013.01); *G02B 7/04* (2013.01); *G02B 23/18* (2013.01); *G02B 23/2438* (2013.01)

(58) Field of Classification Search
CPC .. G01N 21/87; G01N 33/381; G01N 21/8806; G01N 21/64; G01N 21/65
USPC ........................................................... 356/30
See application file for complete search history.

(56) References Cited

U.S. PATENT DOCUMENTS

2003/0021734 A1* 1/2003 Vann .................... B01J 19/0046
506/23
2017/0246399 A1* 8/2017 Forlani ............... A61M 5/1684

* cited by examiner

*Primary Examiner* — Md M Rahman
(74) *Attorney, Agent, or Firm* — Leong C. Lei

(57) ABSTRACT

An external display rangefinder comprises: a shell-body, wherein the front end of the shell-body is respectively set with at least one lenses and a sensing window and the rear end is set with a monitor, wherein the picture of the lenses is displayed by the monitor; and a distance-sensing unit set in the shell-body and corresponded to the sensing window, wherein the distance-sensing unit comprises a plurality of first sensors and second sensors, an operation processor, and a memory; wherein each of the first sensors and second sensors respectively scans at least one first target and a plurality of second targets, and the distances of the first target and each second target are calculated by the operation processor and respectively displayed in the monitor. Thereby, the distances of the first target and each second target can be clearly seen through the monitor to formulate a hitting strategy.

5 Claims, 6 Drawing Sheets

EXTERNAL DISPLAY RANGEFINDER

(a) TECHNICAL FIELD OF THE INVENTION

The present invention relates to a distance measuring device, and more particularly, to an external display rangefinder having a monitor and being capable of simultaneously scanning and detecting a plurality of targets and further measuring the distance between a first target and a plurality of second targets.

(b) DESCRIPTION OF THE PRIOR ART

The rules of the golf are mainly to require the competitor to enter the target (i.e. the Green) hole from the tee shot with the least number of strokes, and the two basic elements that exist between the tee-off point and the target hole are "distance" and "angle" (of course, there are other factors such as wind speed and turf direction, etc., which are not further mentioned here).

In addition to controlling the direction of the ball by the player's swing skill, the most important thing is that the distance of the target must be accurately measured by the player's experience in order to control the near-or-far of the hitting distance.

For the beginners in golf, in addition to having to constantly practice the swinging to improve the ball control and the swing strength, which the most important thing is to learn how to accurately detect the distance between the target and the present location. The conventional distance measuring device has the disadvantage that it can only detect the distance of a single target. For the user, if it is necessary to detect the distance of another target, it needs to be measured in stages, which is not convenient. Moreover, the measurement in stages still needs to record the distance data of each target by using the paper and pen.

In addition, the conventional rangefinder needs to place the rangefinder in front of the eye and observe through the lenses. The disadvantage is that the picture is small and inconvenient to use, so the conventional distance measuring device still needs to be improved.

SUMMARY OF THE INVENTION

In view of the above-mentioned defects, the external display rangefinder of the present invention comprises: a shell-body, wherein the front end of the shell-body is respectively set with at least one lenses and a sensing window, and the rear end of the shell-body is set with a monitor, wherein the picture of the lenses is displayed by the monitor; and a distance-sensing unit set in the shell-body and corresponded to the sensing window, wherein the distance-sensing unit comprises a plurality of first sensors, a plurality of second sensors, an operation processor, and a memory; wherein each of the first sensors and each of the second sensors respectively scans at least one first target and a plurality of second targets, and the distances of the first target and each of the second targets are calculated by the operation processor; and the distance data of the first target and the distance data of each of the second targets are respectively displayed in the monitor. Thereby, the external display rangefinder of the present invention is more convenient to use, and the distance of the first target and the distance of each of the second target around the first target can be clearly seen through the monitor to formulate a hitting strategy.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention.

Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Figure 1:
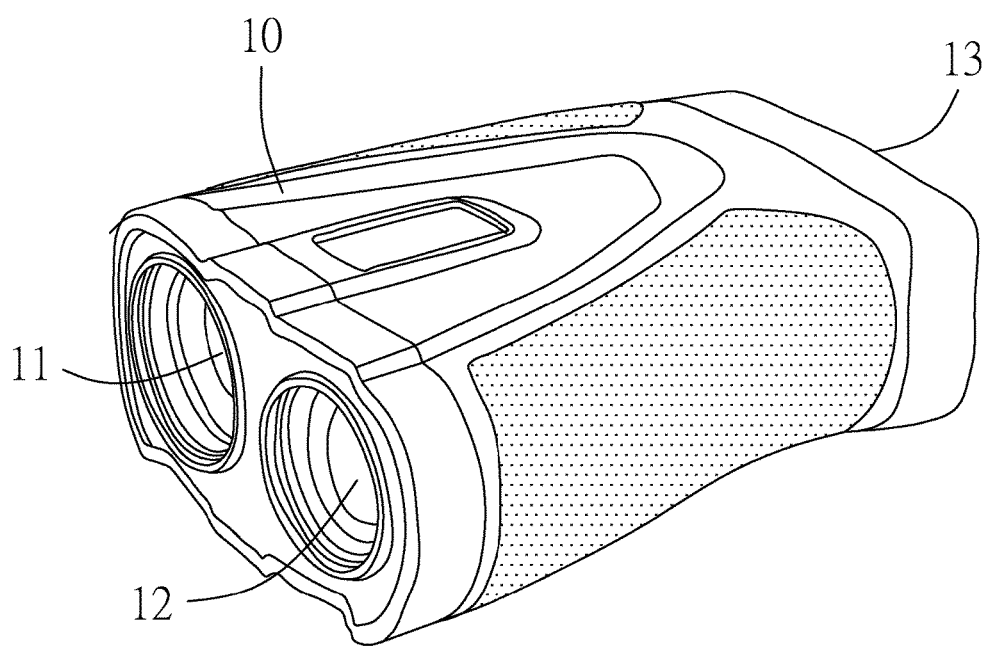
FIG. 1 is a three-dimensional appearance diagram of the present invention.
Figure 2:
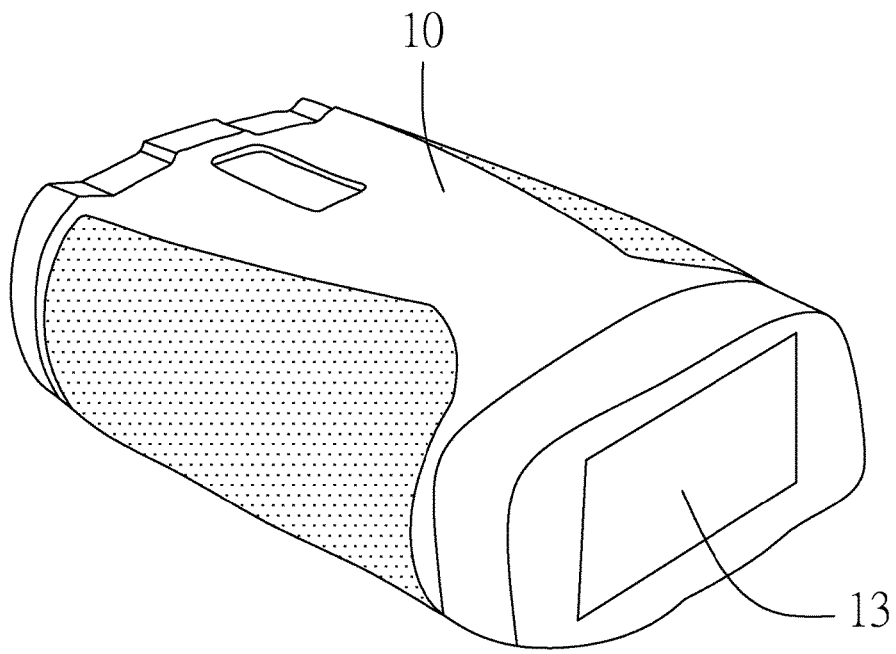
FIG. 2 is a three-dimensional appearance diagram of another perspective continuing FIG. 1.
Figure 3:
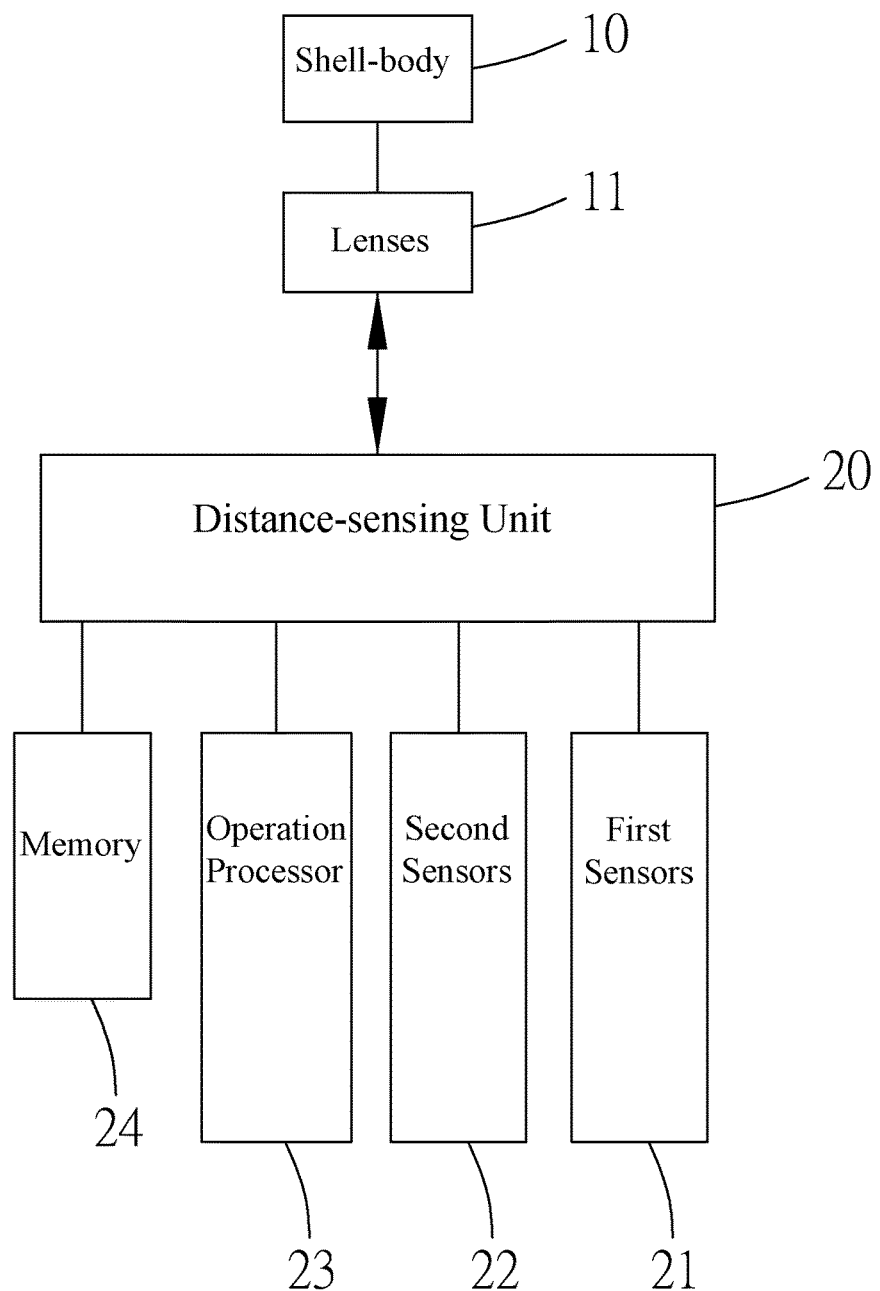
FIG. 3 is a structure schematic diagram of the distance-sensing unit of the present invention.

Please refer to FIG. 1 to FIG. 3, the external display rangefinder of the present invention comprises: a shell-body 10 and a distance-sensing unit 20; wherein a lenses 11 and a sensing window 12 are respectively set on the front of the shell-body 10 and a monitor 13 connected with the lenses 11 is set in the rear of the shell-body 10; wherein the lenses 11 has the functions of optical zoom and digital zoom and the monitor 13 has a crosshair 131, which the image of the lenses 11 is displayed through the monitor 13.

Figure 4:
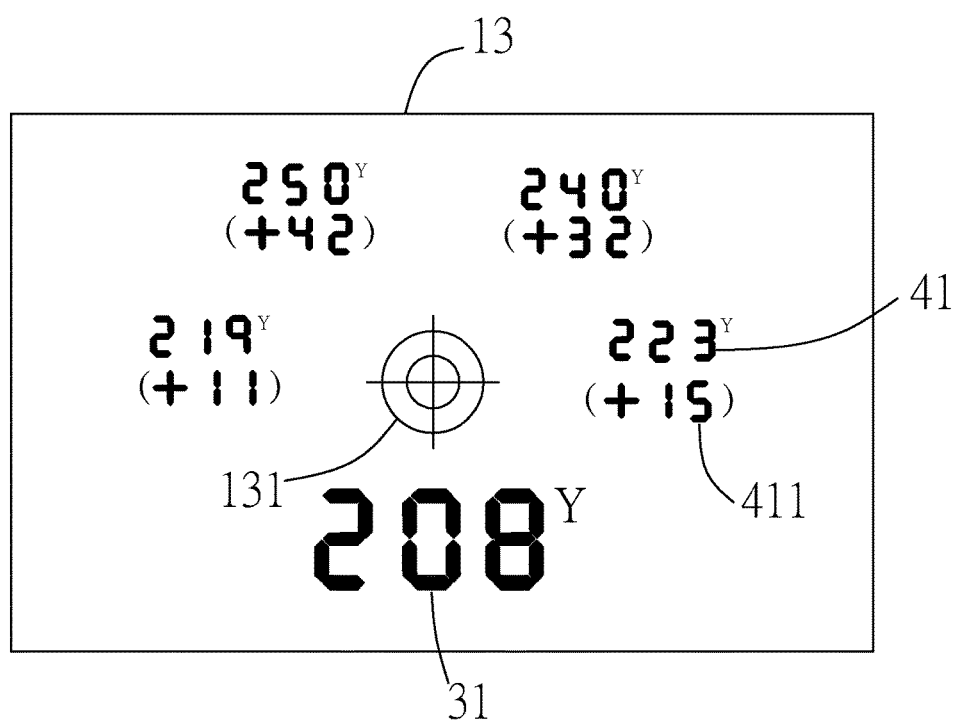
FIG. 4 is a schematic diagram of the monitor display of the present invention.

Please refer to FIG. 3 and FIG. 4, the distance-sensing unit 20 is set in the shell-body 10 and is electrically connected to the lenses 11; wherein the distance-sensing unit 20 corresponds to the sensing window 12, and the distance sensing unit 20 comprises a plurality of first sensors 21, plurality of second sensors 22, an operation processor 23, and a memory 24; wherein each of first sensors 21 and each of the second sensors 22 is a multi-axis sensor.

Figure 5:
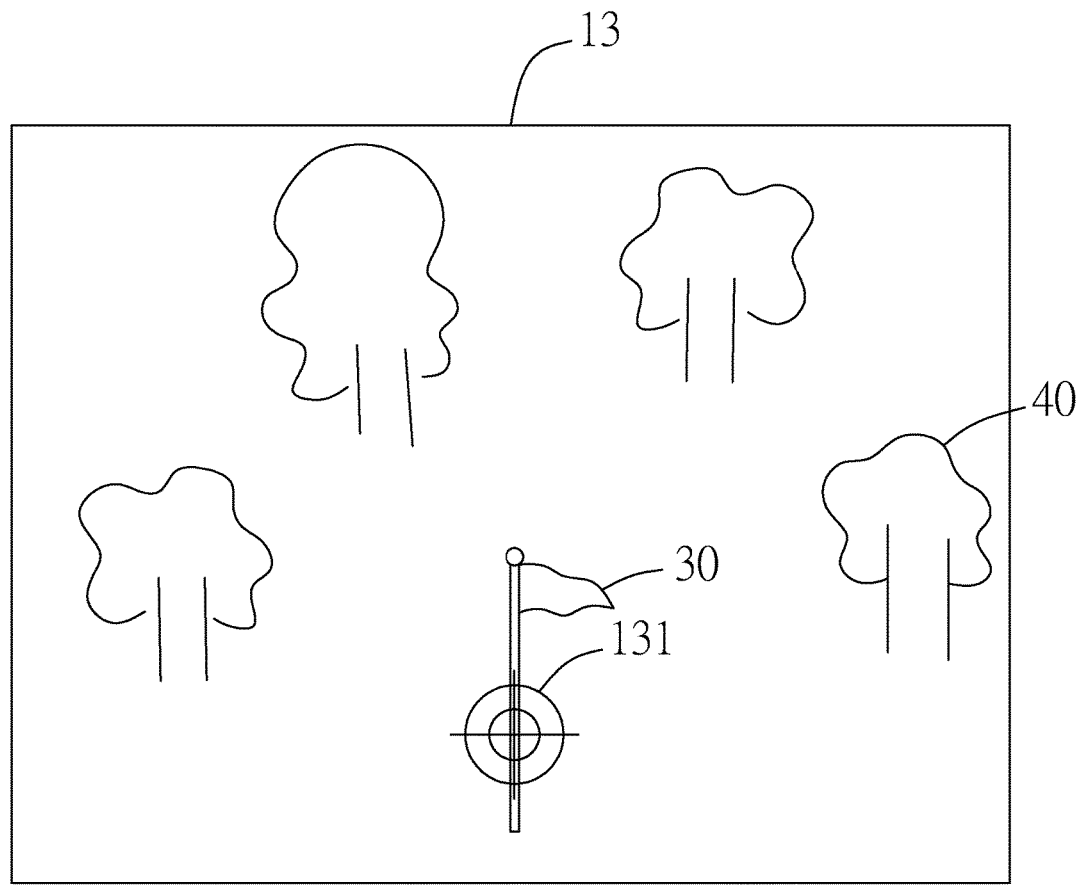
FIG. 5 is a schematic diagram of the distance data continuing FIG. 3.

Please refer to FIG. 4 and FIG. 5, which are the using way of the external display rangefinder of the present invention; the lenses 11 is directed toward the first target 30 and each of the second targets 40; wherein the user can view the first target 30 and each of the second targets 40 through the monitor 13. In this embodiment, the first target 30 is a flagpole, and each of the second targets 40 is the forest tree behind or around the flagpole; wherein each of the first sensors 21 and each of the second sensors 22 respectively scans at least one first target 30 and a plurality of second targets 40 from top to bottom and from left to right reciprocally. The crosshair 131 is provided to aim at the first target 30, and the distance data 31 of the first target 30 is adjacent to the crosshair 131.

The distance between the first target 30 and each of the second targets 40 is calculated by the operation processor 23, and the distance data 31 of the first target 30 and the distance data 41 of each of the second targets 40 are respectively displayed in the monitor 13, that is, the pattern shown in FIG. 5.

At the same time, the distance data 31 of the first target 30 and the distance data 41 of each of the second targets 40 are stored in the memory 24, so that the user can re-view the previous detected distance data 31 and 41 without repeating the scanning detection.

In addition, the distance between the first target 30 and each of the second targets 40 is sequentially displayed from near to far. In short, after the scanning and calculating by the distance sensing unit 20, only the distance data 41 of the closest target is displayed. In this embodiment, the number of the second targets 40 is four, and the distance data 41 of each of the second targets 40 which is matched with the location of each of the second targets 40 is located outside the crosshair 131 and the distance data 31 of the first target 30.

By the operation function of the operation processor 23, a secondary distance data 411 is displayed below the distance data 41 of each of the second targets 40, and the secondary distance data 411 is the distance from the first target 30 to each of the second targets 40.

Figure 6:
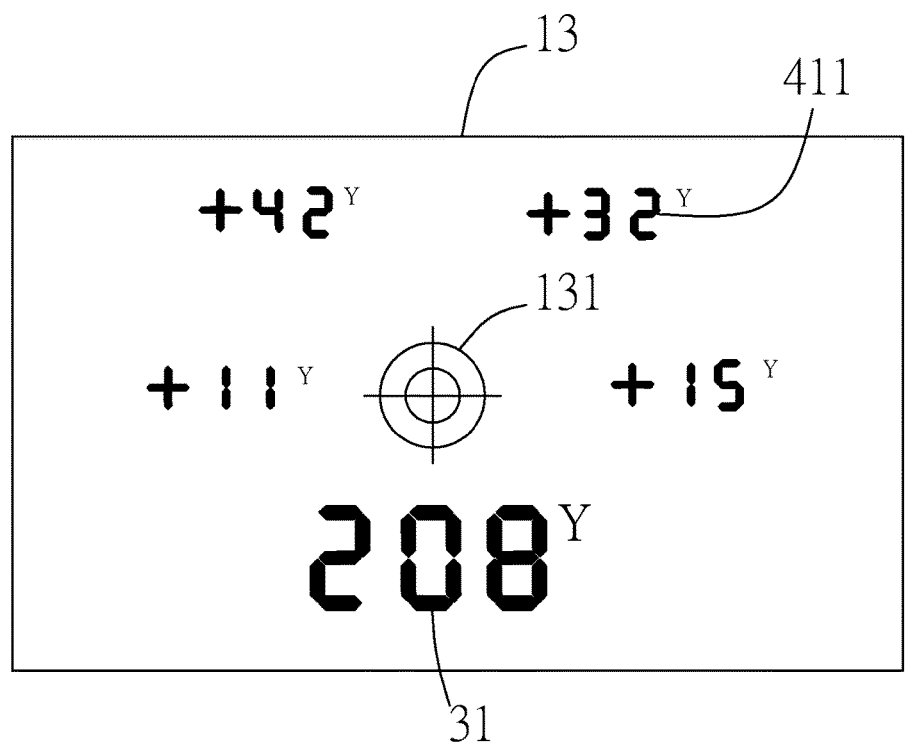
FIG. 6 is a schematic diagram of the distance data of another mode of the present invention.

Please refer to FIG. 6, the user can also change the setting, so that the monitor 13 displays only the distance data 31 of the first target 30 and the secondary distance data 411 of each of the second targets 40 to better conform to the user's observation habit of the data reading.

I claim:

1. An external display rangefinder, which comprises:
a shell-body, wherein the front end of the shell-body is respectively set with at least one lenses and a sensing window, and the rear end of the shell-body is set with a monitor, wherein the picture of the lenses is displayed by the monitor; and
a distance-sensing unit set in the shell-body and electrically connected with the lenses, wherein the distance-sensing unit is corresponded to the sensing window and comprises a plurality of first sensors, a plurality of second sensors, an operation processor, and a memory; wherein each of the first sensors and each of the second sensors respectively scans at least one first target and a plurality of second targets from top to bottom and from left to right reciprocally, and the distances of the first target and each of the second targets are calculated by the operation processor;
wherein the distance data of the first target and the distance data of each of the second targets are respectively displayed in the monitor and stored in the memory, wherein the distance data between the first target and each of the second targets is displayed in order from near to far.

2. The external display rangefinder according to claim 1, wherein each of first sensors and each of the second sensors is a multi-axis sensor.

3. The external display rangefinder according to claim 1, wherein the monitor further displays a crosshair that provides for aiming at the first target, and the distance data of the first target is adjacent to the crosshair.

4. The external display rangefinder according to claim 3, wherein the distance data of each of the second targets is located outside the crosshair and the distance data of the first target.

5. The external display rangefinder according to claim 4, wherein a secondary distance data is displayed below the distance data of each of the second targets, and the secondary distance data is the distance from the first target to each of the second targets.

* * * * *